United States Patent
Ramaiah et al.

(10) Patent No.: US 12,326,964 B2
(45) Date of Patent: Jun. 10, 2025

(54) MANAGEMENT OF CONFIGURATION OF DATA PROCESSING SYSTEMS

(71) Applicant: Dell Products L.P., Round Rock, TX (US)

(72) Inventors: Mahesh Babu Ramaiah, Bangalore (IN); Joseph Caisse, Burlington, MA (US); Ashutosh Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 135 days.

(21) Appl. No.: 18/498,234

(22) Filed: Oct. 31, 2023

(65) Prior Publication Data

US 2025/0139295 A1    May 1, 2025

(51) Int. Cl.
| | | |
|---|---|---|
| *H04L 29/06* | (2006.01) | |
| *G06F 21/31* | (2013.01) | |
| *G06F 21/57* | (2013.01) | |
| *G06F 21/64* | (2013.01) | |

(52) U.S. Cl.
CPC ............ *G06F 21/64* (2013.01); *G06F 21/31* (2013.01); *G06F 21/57* (2013.01)

(58) Field of Classification Search
CPC ...................................................... G06F 21/64
See application file for complete search history.

(56) References Cited

U.S. PATENT DOCUMENTS

| | | |
|---|---|---|
| 7,599,907 B2 | 10/2009 | Havewala et al. |
| 8,020,192 B2 | 9/2011 | Wright et al. |
| 8,490,163 B1 | 7/2013 | Harsell et al. |
| 8,850,186 B2 | 9/2014 | Yamauchi |
| 9,191,781 B2 | 11/2015 | Kumar |
| 9,246,678 B2 | 1/2016 | Nayshtut et al. |
| 9,349,009 B2 | 5/2016 | Rivera |
| 9,721,111 B2 | 8/2017 | Cavanaugh |
| 9,721,175 B2 | 8/2017 | Kursun et al. |
| 9,785,491 B2 | 10/2017 | Cilfone et al. |
| 10,021,669 B2 | 7/2018 | George |
| 10,163,105 B1 | 12/2018 | Ziraknejad et al. |
| 10,169,571 B1 | 1/2019 | Attfield et al. |
| 10,395,039 B2 | 8/2019 | Khatri et al. |
| 10,630,489 B2 | 4/2020 | Hughes |
| 10,678,555 B2 | 6/2020 | Johansson et al. |
| 10,841,295 B1 | 11/2020 | Pecen et al. |
| 11,563,565 B2 | 1/2023 | Yang et al. |
| 11,704,384 B2 | 7/2023 | Murphy et al. |
| 2010/0241836 A1* | 9/2010 | Proudler ............... H04L 63/20 713/1 |

(Continued)

*Primary Examiner* — Jason K Gee
(74) *Attorney, Agent, or Firm* — WOMBLE BOND DICKINSON (US) LLP (57) ABSTRACT

Methods and systems for managing configuration of data processing systems are disclosed. Configuration of data processing systems may be managed by limiting connectivity to components of data processing systems and credentialing access for the components. To enable access to components of data processing systems, the operation of the components may be updated for limited durations of time to allow various devices to communicate with these components. While allowed to communicate, the components of the data process system may restrict access to credentialed users.

20 Claims, 6 Drawing Sheets

(56) References Cited

U.S. PATENT DOCUMENTS

| | | |
|---|---|---|
| 2015/0373538 A1* | 12/2015 | Huang ............... H04W 12/50 |
| | | 726/5 |
| 2017/0277876 A1 | 9/2017 | Alameh et al. |
| 2017/0289197 A1 | 10/2017 | Mandyam et al. |
| 2018/0006829 A1 | 1/2018 | Kravitz et al. |
| 2019/0036785 A1* | 1/2019 | Pfeffer ............... H04L 47/783 |
| 2019/0156019 A1 | 5/2019 | Chen |
| 2021/0004464 A1* | 1/2021 | Lundeby ............ H04L 41/082 |
| 2022/0222328 A1 | 7/2022 | Talib et al. |

* cited by examiner

MANAGEMENT OF CONFIGURATION OF DATA PROCESSING SYSTEMS

FIELD

Embodiments disclosed herein relate generally to managing data processing systems. More particularly, embodiments disclosed herein relate to systems and methods to manage configuration of data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems. The data processing systems may provide computer-implemented services. The computer-implemented services may include any quantity and type of such services.

To provide the computer-implemented services, the data processing systems may need to operate in a predetermined manner conducive to, for example, execution of applications hosted by the data processing systems that provide the computer-implemented services. The applications may utilize certain configurations of hardware resources and/or software resources to provide the desired computer-implemented services.

Different data processing systems may perform different computer-implemented services based on, for example, different operating locations for the data processing systems, use of different applications hosted by the data processing systems, etc. The computer-implemented services provided by a data processing system of the data processing systems may also change over time due to, for example, software updates for the data processing system.

To manage the data processing systems that provide the computer-implemented services, the data processing systems may include management controllers. The management controllers may assist in managing the data processing systems by collecting telemetry data, performing various actions on behalf of control planes, etc.

To secure the management controllers, a security framework may be enforced that limits access to the management controllers through credentialed access and communication limits. Overtime, these mechanisms may be used to at time permit configuration of the management controllers while at other times prevent access to the management controllers. By doing so, the management controllers may be less susceptible to compromise.

Thus, embodiments disclosed herein may address, among others, the technical problem of security in distributed systems that require communication between devices for functionality of the distributed system. A system in accordance with embodiments disclosed herein may do so by limiting communications with management controllers and enforcing credentialed access while other devices are allowed to communicate with the management controllers.

In an embodiment, a method of managing data processing systems is provided. The method may include obtaining, by hardware resources of a data processing system of the data processing systems, a security request for access to a management controller of the data processing system to configure the management controller; deploying, by the hardware resources, a security package to the management controller to place the management controller in a configurable state of operation to enable remote secure configuration of the management controller; obtaining, by the hardware resources and from the management controller, a configuration for validation; attempting, by the hardware resources and responsive to the obtaining of the configuration, to verify that the configuration is a trusted configuration; reverting, by the hardware resources and responsive to the obtaining of the configuration, the management controller to a secure state of operation; and in an instance of the attempting where the configuration is verified as a trusted configuration: configuring, by the hardware resources, the management controller to obtain an updated secure state of operation of the management controller.

While the management controller is in the secure state of operation, a user device may be unable to operably connect to the management controller.

While the management controller is in the configurable state of operation, the user device may be able to operably connect to the management controller.

The security package may include a container, and the management controller may be configured to deploy the container to enter the configurable state of operation The container may include a set of credentials defined by a control plane that manages operation of the data processing system.

The method may also include obtaining, by the hardware resources, the credentials from the management controller.

The container may include a configuration application adapted to enable a user that uses the credentials to access the management controller to view and modifying configurations of the management controller.

The method may also include identifying, by the hardware resources, that a duration of time from when the time at which the management controller began to operate in the configurable state. The reverting may be initiated responsive to an occurrence of the duration of time.

The management controller may be an independently operating data processing system hosted by the data processing system, and the hardware resources are distinct from the management controller. The management controller may include a system on a chip.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1A:
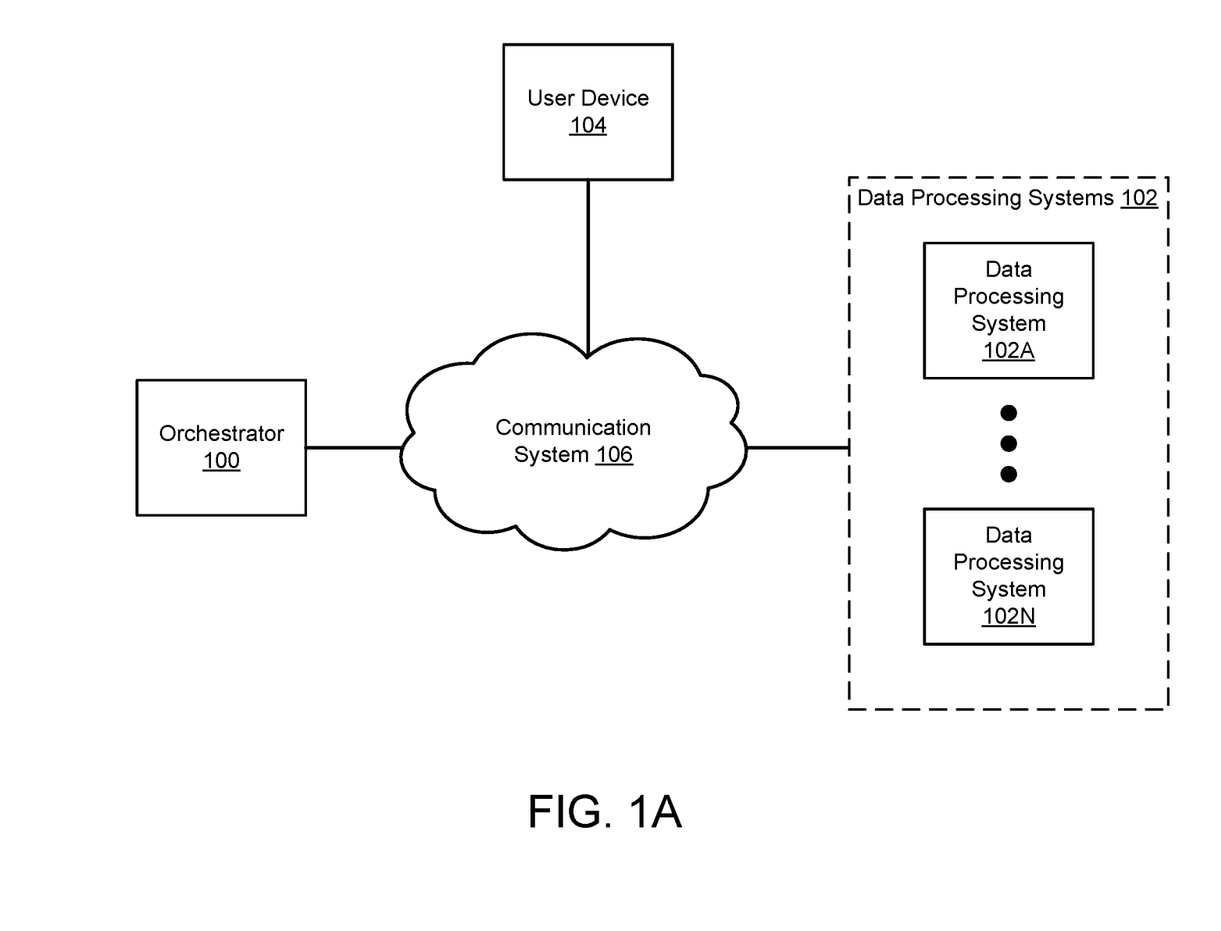
FIG. 1A shows a block diagram illustrating a system in accordance with an embodiment.

Turning to FIG. 1A, a block diagram illustrating a system in accordance with an embodiment is shown. The system shown in FIG. 1A may provide computer-implemented services. The computer-implemented services may include any type and quantity of computer-implemented services. The computer-implemented services may include, for example, database services, data processing services, electronic communication services, and/or any other services that may be provided using one or more computing devices.

To provide the computer implemented services, various hardware components may be utilized. The hardware components may include, for example, processors, memory modules, storage devices, network interface cards, and/or other types of hardware components. The hardware components may be part of data processing systems that provide the computer implemented services.

To provide the computer implemented services, the hardware components may need to operate in a predetermined manner. If the hardware components do not operate in the predetermined manner, then the data processing systems may be unable to provide the computer implemented services.

To improve the likelihood of the computer implemented services being provided, information (e.g., telemetry data) regarding the operation of the hardware components may be obtained and used to predict whether any of the hardware components are likely to operate in an undesirable manner. For example, information regarding the health of the hardware components may be collected and analyzed to identify whether any of the hardware components are likely to fail, to become impaired, etc.

To collect telemetry data, the data processing systems may connect to and send data to other devices. For example, the data processing systems may operably connect to orchestrators or other types of devices forming a control plane for the data processing systems. The telemetry data may be provided to the control plane for analysis.

However, connecting to remote devices may present threats to the operation of the data processing systems. For example, malicious entities may attempt to use such connections to compromise data distributed by the data processing systems to other devices, and/or compromise the data processing systems themselves.

Further, over time the type and quantity of telemetry data may need to be modified to respond to changes conditions within a distributed system. For example, different diagnostic processes may require access to different types of telemetry data. To modify the manner in which telemetry data is collected and distributed, the data processing systems may allow for remote entities to connect with and configure the data processing systems.

However, such connections, like those for distribution of telemetry data, may present security risks. For example, malicious actors may attempt to connect with and modify the operation of data processing systems using open interfaces, ports, etc. that are intended to be used for configuration purposes for telemetry data collection.

In general, embodiments disclosed herein relate to systems, devices, and methods for securing the operation of data processing systems. To secure the operation of the data processing systems, a security framework may be enforced on the data processing systems that reduces the likelihood of compromise of the data processing systems.

The security framework may require that certain security precautions be taken prior to enabling remote configuration of the data processing systems. The security precautions may include deployment of containers or other software to components of the data processing systems prior to the components of the data processing systems enabling remote entities to connect with them and/or use of certain credentials to interact with the containers. The containers may include certain security safeguards (e.g., credential checking, network connectivity limits, etc.) thereby allowing the components to enter configurable states while mitigating security risks associated with being in a configurable state (e.g., broader network connectivity allowing for more vectors of attack). While in the configurable states, the components may expand the range of network connectivity to facilitate remote connection. However, remote entities that do connect to the components in the configurable states may only be allowed to define a desired configuration for the components (e.g., as opposed to configure the components).

Additionally, the security frameworks may require that the data processing systems verify that desired configurations for components are trusted prior to updating the operation of the components based on the desired configurations. For example, the desired configurations may be compared against trusted configurations to ascertain whether the desired configurations are acceptable for use.

If the desired configurations are acceptable for use, then the operation of the components may be correspondingly updated.

Once the desired configuration is defined and/or time limits for duration of deployment of the containers are reached, the operation of the components of the data processing systems may be reverted to a secure state. While in the secure state, the components may limit the range of the network connectivity to mitigate against threats present in a network environment and/or may take other elevated security precautions. For example, network ports may be closed, traffic from certain senders may be blackholed, only whitelisted entities may be communicated with by the network components, etc.

By doing so, embodiments disclosed herein may facilitate remote modification of operation of components of data processing systems while reducing the likelihood of compromise of the data processing systems.

To provide the above noted functionality, the system of FIG. 1A may include any number of data processing systems 102, orchestrator 100, and user device 104. Each of these components is discussed below.

Orchestrator 100 may manage, in part, the operation of data processing systems 102. To do so, orchestrator 100 may serve as a member of a distributed control plane. The distributed control plane may (i) manage access to credentials for containers hosted by components of data processing systems 102, and (ii) verify whether desired configurations for components of data processing systems 102 are acceptable.

To manage access to the credentials and/or verify the acceptability of desired configurations, orchestrator 100 may (i) rotate (e.g., change) the credentials over time, (ii) provide the credentials to administrators or other persons tasked with configuring operation of data processing systems 102 to enable the administrators to connect with and modify operation of components of data processing systems 102, (iii) when credentials for a data processing system are requested, initiate deployment of a container to a component (e.g., a management controller) of the data processing system for a duration of time (e.g., limited duration) and configure the container to accept the requested credentials, (iv) maintain a list of trusted configurations and/or other information usable to discriminate trusted from untrusted configurations of data processing systems, (v) identify whether desired configurations for data processing systems are trusted based on the list and/or other information, and/or perform other actions for managing credentials.

User device 104 may be a device (e.g., cell phone, desktop computer, laptop computer, etc.) used by an administrator of data processing systems 102 to manage the operation of the components of data processing systems 102. To update operation of a data processing system, user device 104 may send a request for credentials for the data processing systems to orchestrator 100. If the requestor is sufficiently privileged, orchestrator 100 may provide the credentials (e.g., and mark the credentials for rotation) to the requestor and initiate deployment of the container, as discussed above. User device 104 may operably connect to the data processing system and use the credentials to access and establish a desired configuration for one or more components of the data processing system. The component may be a management controller that, for example, collects telemetry data and/or otherwise facilitates remote management of the data processing system.

Figure 1B:
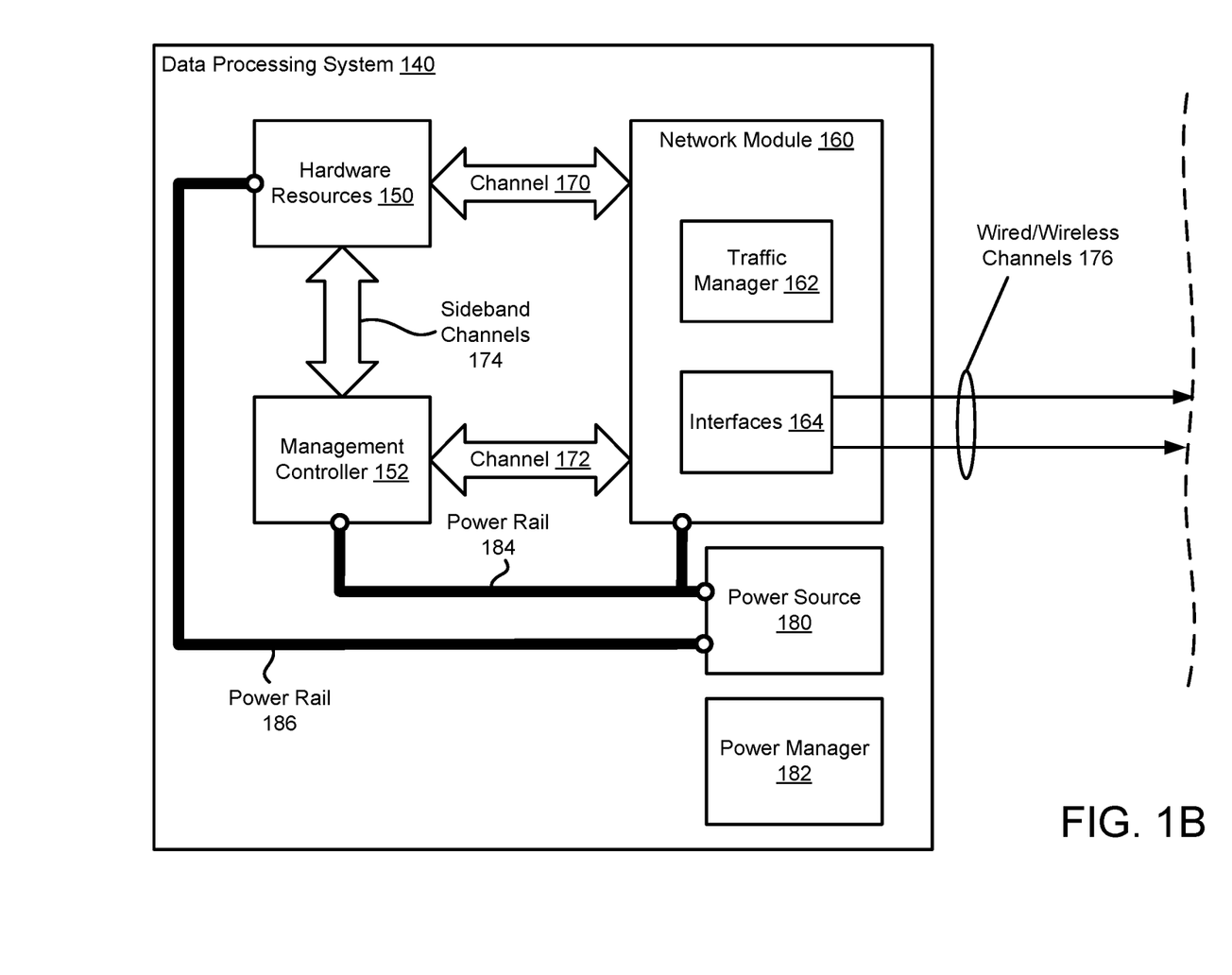
FIG. 1B shows a block diagram illustrating a data processing system in accordance with an embodiment.

Data processing systems 102 may provide the computer implemented services, discussed above. To do so, each (e.g., 102A-102N, may be any number) data processing system may include hardware resources (e.g., processors, memory modules, storage devices, etc.) and a management controller. Refer to FIG. 1B for additional details regarding the management controller.

To facilitate remote connection to and configuration of the management controller, the hardware resources may receive requests from the control plane to deploy a container to the management controller. When deployed, the management controller may enter a configurable state in which the management controller may have increased network visibility/connectivity to facilitate connection to it. For example, deployment of the container may open various ports and may enable the management controller to present portals or other interfaces through which users may view and edit the configuration of the management controller to define a desired configuration. However, when a change to the configuration of the management controller is made via the portal, the change may not be implemented until verified as trusted with the control plane. By doing so, undesired changes to the configuration of the management controller may be unlikely to be made.

After the change is confirmed as acceptable and/or limits on the duration of deployment of the container is reached, the component may revert to a secure operating state. In the secure operating state, the container may limit the ability of remote entities to connect with it (e.g., by closing ports, blackholing traffic, etc.) thereby cutting off user device 104 from connecting to and attempting to configure it. Once in the secure operating state, the operation of the management controller may be updated based on desired configurations deemed to be trustworthy.

Figure 2A:
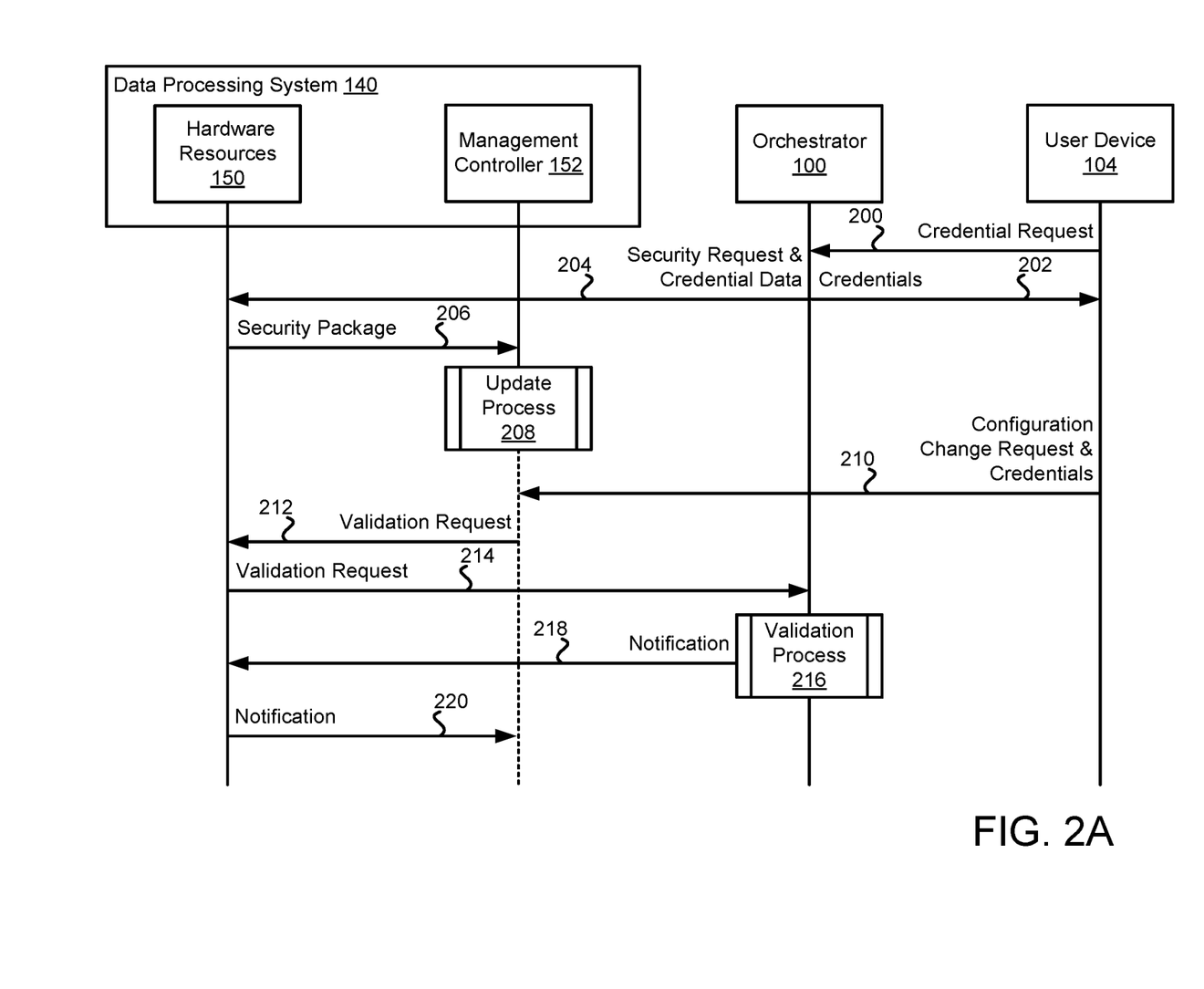
FIGS. 2A-2B show interaction diagrams in accordance with an embodiment.
Figure 2B:
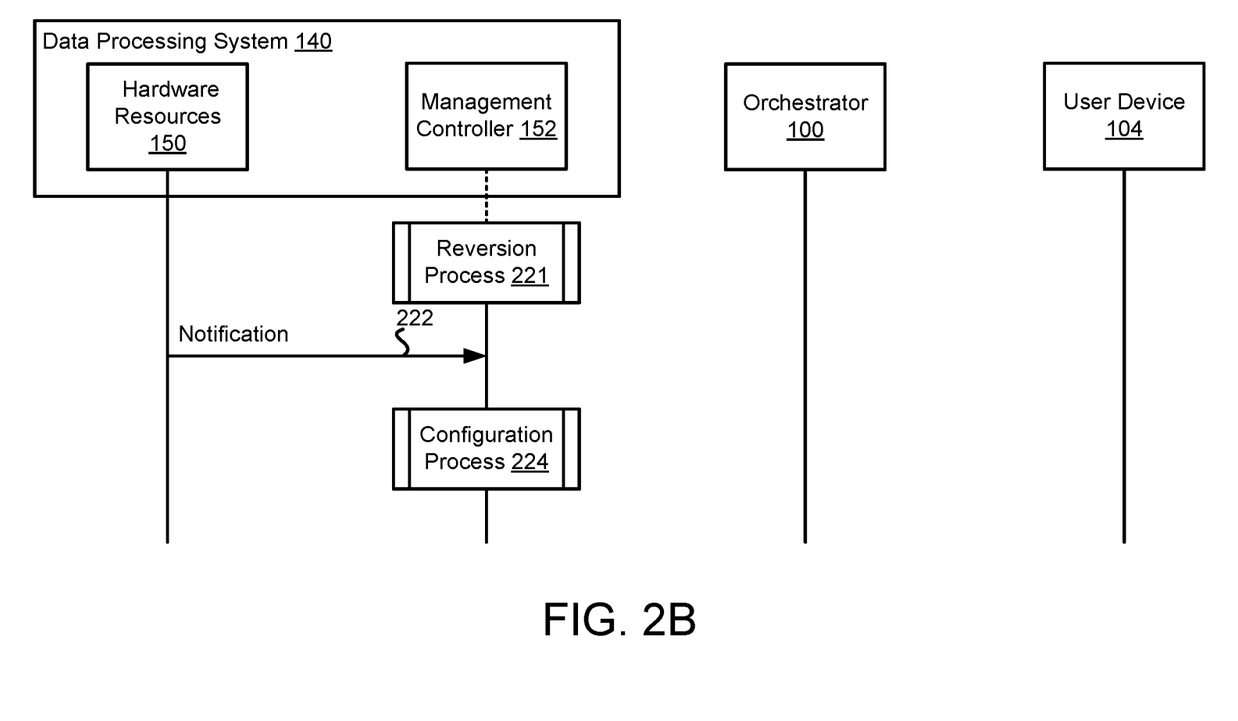
Figure 3:
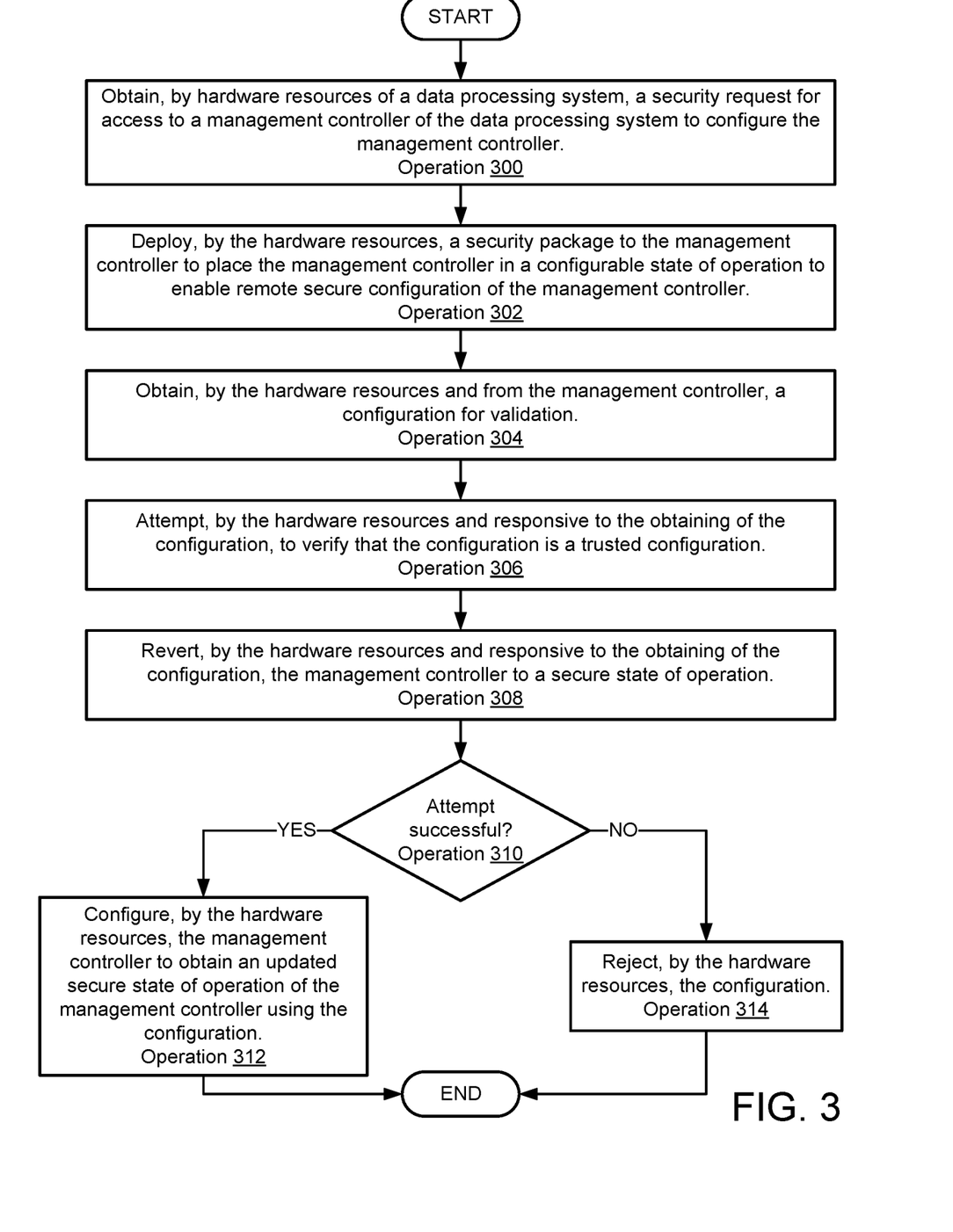
FIG. 3 shows a flow diagram illustrating a method of managing configuration of a data processing system in accordance with an embodiment.

When providing their functionality, any of (and/or components thereof) orchestrator 100, data processing systems 102, and user device 104 may perform all, or a portion, of the actions and methods illustrated in FIGS. 2A-3.

Any of (and/or components thereof) orchestrator 100, data processing systems 102, and user device 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1A as including a limited number of specific components, a system in accordance with an embodiment may include fewer, additional, and/or different components than those illustrated therein.

Turning to FIG. 1B, a diagram illustrating data processing system 140 in accordance with an embodiment is shown. Data processing system 140 may be similar to any of data processing systems 102 shown in FIG. 1A.

To provide computer-implemented services, data processing system 140 may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP)

(e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communication with other entities.

To communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

To facilitate remote management of data processing system 140, data processing system 140 may include management controller 152 and network module 160. Each of these components of data processing system 140 is discussed below.

Management controller 152 may be implemented, for example, using a system on a chip or other type of independently operating computing device (e.g., independent from the in-band components, such as hardware resources 150, of a host data processing system 140). Management controller 152 may provide various management functionalities for data processing system 140. For example, management controller 152 may monitor various ongoing processes performed by the in-band component, may manage power distribution, thermal management, may collect and provide telemetry data to other devices (e.g., a control plane), and/or may provide various other functionalities.

To do so, management controller 152 may be operably connected to various components via sideband channels 174 (in FIG. 1B, a limited number of sideband channels are included for illustrative purposes, it will be appreciated that management controller 152 may communication with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

Management controller 152 may be operably connected to other entities via hardware resources 150 or may independently communicate with them. If connected via hardware resources 150, management controller 152 may send communication to the hardware resources which may then forward them separately to other entities.

Management controller 152 may be operably connected to communication components of data processing system 140 via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.).

To facilitate communication with other devices, data processing system 140 may include network module 160. Network module 160 may provide communication services for in-band components and/or out-of-band components (e.g., management controller 152) of data processing system 140. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may or may not flow through the in-band components. Likewise, outbound traffic from the out-of-band component may or may not flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These component may support any number of wired/wireless channels 176.

Thus, from the perspective of an external device, the in-band components and out-of-band components of data processing system 140 may appear to be two independent network entities, that may independently addressable, and otherwise unrelated to one another. If no separate out of band channel is available (e.g., channel 172 does not exist), then hardware resources may be leveraged by management controller 152 for communications.

To facilitate management of data processing system 140 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 140 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 is supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

To reduce attack vectors, management controller 152 may generally operate in a secure operating state. While in the secure operating state, communication with other devices may be limited. For example, generally management controller 152 may host a software environment that limits communications.

To facilitate configuration of management controller 152, hardware resources 150 may host an agent that may selectively deploy and remove various containers from management controller 152. When a container is deployed to management controller 152, the container may enable a broader range of devices (e.g., user device) to communicate with it, may provide portal access, etc. However, the container may also include access controls that require credentials to be provided for access to the system.

The credentials may be managed by a control plane which may rotate the credentials over time. Consequently, the credentials may only be valid for limited durations of time.

Additionally, when a container is deployed to management controller 152, the duration of deployment may be limited. Once the limited duration of deployment time has elapsed, the container may automatically be removed thereby reverting the operating state of the management controller to the secure operating state. Accordingly, devices previously able to communicate with management controller 152 may be cut off. The use of limited communications and credentialed access may reduce the likelihood of compromise of management controller 152. Refer to FIGS. 2A-2B for additional details regarding operation of management controller 152 in accordance with the security framework.

When providing their functionality, hardware resources 150 and/or management controller 152 may perform all, or a portion, of the methods and operations illustrated in FIGS. 2A-3.

While illustrated in FIG. 1B with a limited number of specific components, a system may include additional, fewer, and/or different components without departing from embodiments disclosed herein.

To further clarify embodiments disclosed herein, interactions diagrams in accordance with an embodiment are shown in FIGS. 2A-2B. These interactions diagrams may illustrate how data may be obtained and used within the system of FIG. 1A-1B.

In the interaction diagrams, processes performed by and interactions between components of a system in accordance with an embodiment are shown. In the diagrams, components of the system are illustrated using a first set of shapes (e.g., 100, 104, etc.), located towards the top of each figure. Lines descend from these shapes. Processes performed by the components of the system are illustrated using a second set of shapes (e.g., 208, 216, etc.) superimposed over these lines. Interactions (e.g., communication, data transmissions, etc.) between the components of the system are illustrated using a third set of shapes (e.g., 200, 202, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 200 may occur prior to the interaction labeled as 202. However, it will be appreciated that the processes and interactions may be performed in different orders, any may be omitted, and other processes or interactions may be performed without departing from embodiments disclosed herein.

Some lines descending from shapes are drawing in solid or dashing to indicate operational states of the components. For example, the line descending from management controller 152 is drawn in solid initially to indicate that management controller 152 is operating in a secure operating state. However, the line becomes dashed further down the page to indicate that management controller 152 is in a configurable state of operation.

Turning to FIG. 2A, a first interaction diagram in accordance with an embodiment is shown. The first interaction diagram may illustrate processes and interactions that may occur during configuration of management controller 152.

Over time, an administrator of a data processing system may decide that the configuration of management controller 152 needs to be updated. For example, the configuration may need to be updated to change the way in which telemetry data is collected, the manner in which management controller 152 interacts with and/or manages data processing system 140, and/or for other reasons.

To configure management controller 152, the administrator may, at interaction 200, use user device 104 to send a credential request to orchestrator 100. Orchestrator 100 may manage data processing system 140 and have access to the credentials. If the administrator is validated, at interactions 202 and 204, orchestrator 100 may provide the credentials to user device 104 and send a security request and credential data to hardware resources 150.

An agent or other software entity hosted by hardware resources 150 may receive the security request & credential data, and identify that a container is to be deployed to management controller 152 so that user device 104 may connect to it. Based on the security request, at interaction 206, hardware resources 150 may provide a security package to management controller 152. The security package may include the container and/or other data for updating the operation of management controller 152. Additionally, the security package may include the credential data. The credential data may be usable to verify the credentials provided to user device 104 at interaction 202.

Prior to receiving the security package, management controller 152 may be operating in a secure state (e.g., limited interaction with other components). However, upon receipt (e.g., and validation of the security package, which may be signed and management controller 152 may verify the signature) and processing, management controller 152 may perform update process 208.

During update process 208, management controller 152 may deploy a container based on the security package. The container may include software, configurations, etc. that enable user device 104 to connect to a portal provided by the container, and/or an access management system. The portal may enable user device 104 to obtain information regarding the existing configuration of management controller 152, and provide user input to define a desired configuration for management controller 152.

For example, management controller 152 may host a container engine (e.g., docker) that may allow for an image of the container to be used to begin execution of the container.

Once the container is operating, at interaction 210, user device 104 may use a presented portal to send a configuration change request and the credentials. By providing the credentials, management controller 152 may verify that the user of user device 104 is trustworthy and allow the user to define a desired configuration for management controller 152.

Once the desired configuration is defined, at interaction 212, management controller 152 may send the desired configuration as part of a validation request to hardware resources 150. In turn, at interaction 214, the validation request may be provided to orchestrator 100 (or another portion of the control plane) for validation.

Once obtained by the control plane, validation process 216 may be performed. During the validation process, the desired configuration may be analyzed to ascertain whether it is acceptable. For example, the desired configuration may be compared to configurations deemed as being acceptable, may be analyzed using a set of rules, and/or may otherwise be analyzed to ascertain whether the desired configuration is acceptable.

If acceptable, at interaction 218, a notification may be sent back to hardware resources 150. The notification may indicate whether the desired configuration is acceptable and/or to revert to a secure state of operation.

The notification, at interaction 220, may be forwarded to management controller 152.

Turning to FIG. 2B, a second interaction diagram in accordance with an embodiment is shown. The second interaction diagram may be a continuation of the first interaction diagram.

Continuing with the discussion, once the notification is received, management controller 152 may perform reversion process 221. During reversion process 221, the container may be remoted and/or other changes to the operation of management controller 152 may be made to return it to the secure state of operation. Consequently, communications with user device 104 may be cut off.

If the desired configuration is deemed acceptable, configuration process 224 may be performed. During configuration process 224, management controller 152 may update itself to conform to the desired configuration. To do so, management controller 152 may (i) modify one or more hardware/software configuration settings, (ii) add/remote/modify one or more pieces of hosted software, (iii) disable/enable one or more pieces of hardware, and/or may perform other activity to update its operation while in the secure state of operation.

The updated operation may cause, for example, management controller 152 to obtain and distribute at least some different types of telemetry data (e.g., different from that collected prior to being updated). Consequently, the control plane may be able to use the different types of telemetry for management of data processing system 140.

However, if the desired configuration (or a portion of it) is not deemed acceptable, then management controller 152 may not update its operation (all, or in part). Consequently, management controller 152 may continue to operate consistently with its previous operation.

Following reversion process 221, at interaction 222, hardware resources 150 may send another notification to management controller 152. The other notification may specify the portions of the desired configuration deemed to be acceptable. Consequently, no data obtained while in the configurable state of operation may need to be retained by management controller 152, further hardening it against various threats.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1A may perform various methods to manage data processing systems. FIG. 3 illustrates methods that may be performed by the components of FIGS. 1A-1B. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of updating a configuration of a management controller in accordance with an embodiment is shown. The method may be performed, for example, by a data processing system, and/or other components of the system of FIGS. 1A-1B.

At operation 300, a security request for access to a management controller of the data processing system is obtained by hardware resources of the data processing system. The security request may be to configure the management controller. The security request may be obtained by reading it from another device, by reading it from storage, by generating it based on user input, and/or via other methods.

At operation 302, a security package is deployed to the management controller by the hardware resources to place the management controller in a configurable state of operation to enable remote secure configuration of the management controller. The security package may be deployed by sending it to the management controller. The security package may include a container image, credential data, and/or other information.

At operation 304, a configuration for validation is obtained by the hardware resources and from the management controller. The configuration may be obtained by receiving it from the management controller.

At operation 306, an attempt is made by the hardware resources and responsive to the obtaining of the configuration to verify that the configuration is a trusted configuration. The attempt may be made by sending the configuration to a control plane. The control plane may indicate whether the configuration is a trusted configuration.

At operation 308, the management controller is reverted to a secure state of operation by the hardware resources. The reversion may be made responsive to the obtaining of the configuration. The management controller may be reverted by sending instructions to the management controller. When received, the management controller may remove/suspend execution of a container through which the configuration was obtained. For example, a user may have provided credentials to authenticate themselves to the management controller (e.g., verifiable using the credential data) and then provided user input defining the configuration (e.g., a desired configuration).

At operation 310, it is determined whether the attempt to verify the credentials was successful. The determination may be made based on the response from the control plane.

If the attempt is successful, then the method may proceed to operation 312.

Otherwise, the method may proceed to operation 314.

At operation 312, the management controller is configured to obtain an updated secure state of operation of the management controller using the configuration. The management controller may be configured by the hardware resources. The management controller may be configured by providing instructions to perform the configuration, by providing a signed copy of the configuration (e.g., signed by the control plane so the management controller is able to verify the trust/authenticity of the configuration), and/or via other methods. The management controller may, upon verification of trust in the configuration, implement the configuration. To do so, the management controller may include an automation engine to update its operation based on the configuration.

The method may end following operation 312.

Returning to operation 314, the method may proceed to operation 314 if the attempt is unsuccessful.

At operation 314, the configuration is rejected by the hardware resources. The configuration may be rejected by, for example, sending instructions to the management controller to not use the configuration, and/or via other methods. Thus, the management may continue to operate as it had previously operated.

The method may end following operation 314.

While described with respect to containers, it will be appreciated that other types of software may be deployed to and removed from management controllers to update their operating states (e.g., secure, configurable, etc.) without departing from embodiments disclosed herein. For example, virtual machines, application images, etc. may be deployed/removed over time to manage the operating states of the components of data processing systems.

Figure 4:
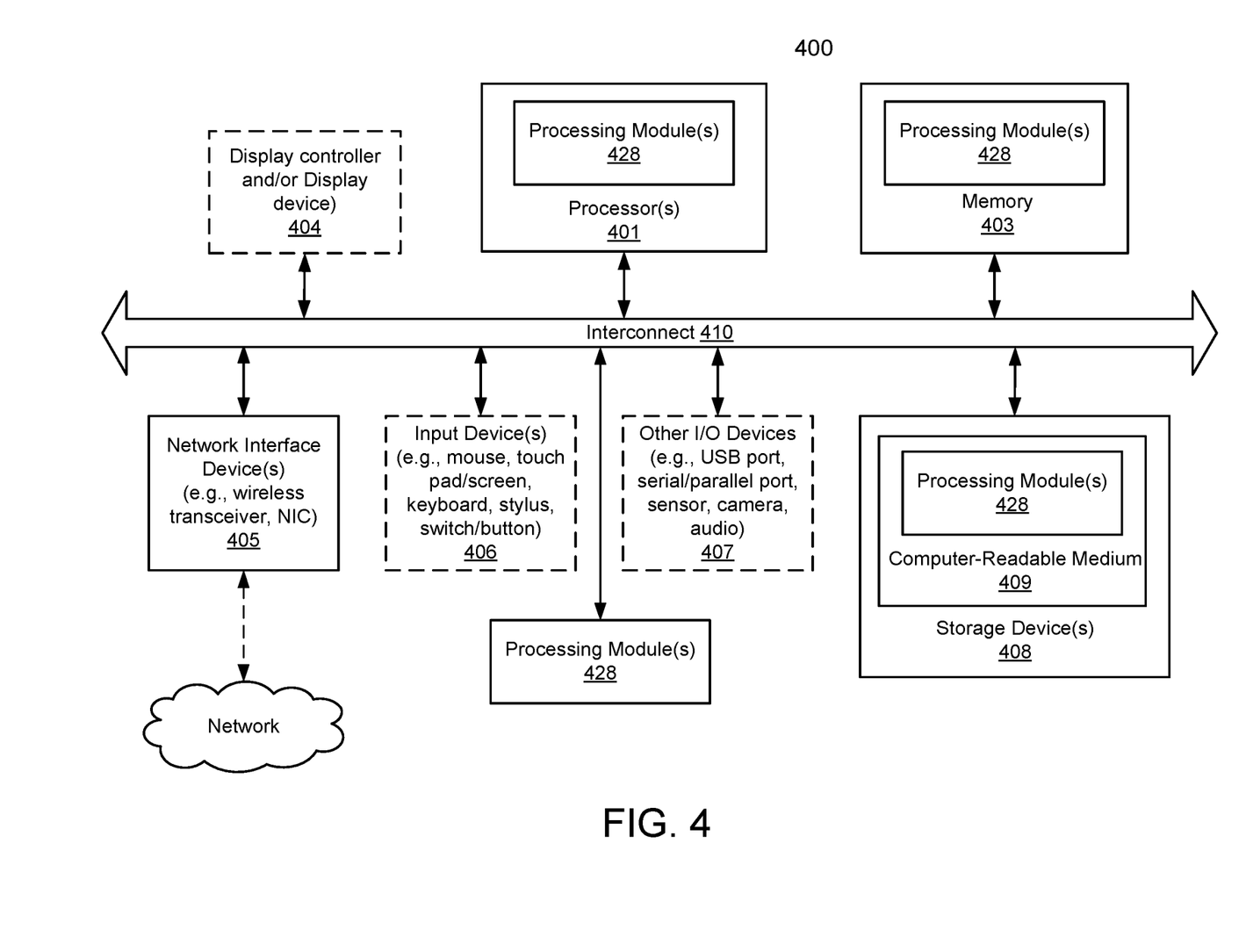
FIG. 4 shows a block diagram illustrating a data processing system in accordance with an embodiment.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing data processing systems, the method comprising:
   obtaining, by hardware resources of a data processing system of the data processing systems, a security request for access to a management controller of the data processing system to configure the management controller;
   deploying, by the hardware resources, a security package to the management controller to place the management controller in a configurable state of operation to enable remote secure configuration of the management controller;
   obtaining, by the hardware resources and from the management controller, a configuration for validation;
   attempting, by the hardware resources and responsive to the obtaining of the configuration, to verify that the configuration is a trusted configuration;
   reverting, by the hardware resources and responsive to the obtaining of the configuration, the management controller to a secure state of operation; and
   in an instance of the attempting where the configuration is verified as a trusted configuration:
      configuring, by the hardware resources, the management controller to obtain an updated secure state of operation of the management controller.

2. The method of claim 1, wherein while the management controller is in the secure state of operation, a user device is unable to operably connect to the management controller.

3. The method of claim 2, wherein while the management controller is in the configurable state of operation, the user device is able to operably connect to the management controller.

4. The method of claim 1, wherein the security package comprises a container, and the management controller is configured to deploy the container to enter the configurable state of operation.

5. The method of claim 4, wherein the container comprises a set of credentials defined by a control plane that manages operation of the data processing system.

6. The method of claim 5, further comprising:
   obtaining, by the hardware resources, the credentials from the management controller.

7. The method of claim 6, wherein the container comprises a configuration application adapted to enable a user that uses the credentials to access the management controller to view and modifying configurations of the management controller.

8. The method of claim 1, further comprising:
   identifying, by the hardware resources, that a duration of time from when the time at which the management controller began to operate in the configurable state,
   wherein the reverting is initiated responsive to an occurrence of the duration of time.

9. The method of claim 1, wherein the management controller is an independently operating data processing system hosted by the data processing system, and the hardware resources are distinct from the management controller.

10. The method of claim 9, wherein the management controller comprises a system on a chip.

11. A non-transitory machine-readable medium having instructions stored therein, which when executed by a processor, cause the processor to perform operations for managing data processing systems, the operations comprising:
   obtaining, by hardware resources of a data processing system of the data processing systems, a security request for access to a management controller of the data processing system to configure the management controller;

deploying, by the hardware resources, a security package to the management controller to place the management controller in a configurable state of operation to enable remote secure configuration of the management controller;

obtaining, by the hardware resources and from the management controller, a configuration for validation;

attempting, by the hardware resources and responsive to the obtaining of the configuration, to verify that the configuration is a trusted configuration;

reverting, by the hardware resources and responsive to the obtaining of the configuration, the management controller to a secure state of operation; and in an instance of the attempting where the configuration is verified as a trusted configuration:
  configuring, by the hardware resources, the management controller to obtain an updated secure state of operation of the management controller.

12. The non-transitory machine-readable medium of claim 11, wherein while the management controller is in the secure state of operation, a user device is unable to operably connect to the management controller.

13. The non-transitory machine-readable medium of claim 12, wherein while the management controller is in the configurable state of operation, the user device is able to operably connect to the management controller.

14. The non-transitory machine-readable medium of claim 11, wherein the security package comprises a container, and the management controller is configured to deploy the container to enter the configurable state of operation.

15. The non-transitory machine-readable medium of claim 14, wherein the container comprises a set of credentials defined by a control plane that manages operation of the data processing system.

16. A data processing system, comprising:
  a management controller;
  hardware resources comprising a processor; and
  a memory coupled to the processor to store instructions, which when executed by the processor, cause the processor to perform operations, the operations comprising:
    obtaining, by the hardware resources, a security request for access to the management controller to configure the management controller;
    deploying, by the hardware resources, a security package to the management controller to place the management controller in a configurable state of operation to enable remote secure configuration of the management controller;
    obtaining, by the hardware resources and from the management controller, a configuration for validation;
    attempting, by the hardware resources and responsive to the obtaining of the configuration, to verify that the configuration is a trusted configuration;
    reverting, by the hardware resources and responsive to the obtaining of the configuration, the management controller to a secure state of operation; and
    in an instance of the attempting where the configuration is verified as a trusted configuration:
      configuring, by the hardware resources, the management controller to obtain an updated secure state of operation of the management controller.

17. The data processing system of claim 16, wherein while the management controller is in the secure state of operation, a user device is unable to operably connect to the management controller.

18. The data processing system of claim 17, wherein while the management controller is in the configurable state of operation, the user device is able to operably connect to the management controller.

19. The data processing system of claim 16, wherein the security package comprises a container, and the management controller is configured to deploy the container to enter the configurable state of operation.

20. The data processing system of claim 19, wherein the container comprises a set of credentials defined by a control plane that manages operation of the data processing system.

* * * * *